United States Patent
Fast, Jr.

(10) Patent No.: US 10,243,349 B2
(45) Date of Patent: *Mar. 26, 2019

(54) INDUCTIVE KICKBACK PROTECTION BY USING MULTIPLE PARALLEL CIRCUIT BREAKERS WITH DOWNSTREAM TVS DIODES

(71) Applicant: INTERNATIONAL BUSINESS MACHINES CORPORATION, Armonk, NY (US)

(72) Inventor: William Fast, Jr., Houston, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/667,029

(22) Filed: Aug. 2, 2017

(65) Prior Publication Data

US 2018/0131176 A1     May 10, 2018

Related U.S. Application Data

(63) Continuation of application No. 15/347,864, filed on Nov. 10, 2016.

(51) Int. Cl.
    *H02H 3/20*      (2006.01)
    *H02H 9/04*      (2006.01)

(52) U.S. Cl.
    CPC .............. *H02H 3/20* (2013.01); *H02H 9/044* (2013.01)

(58) Field of Classification Search
    CPC ........... H02H 9/06; H02H 9/046; H02H 9/005

USPC .......................................................... 361/111
See application file for complete search history.

(56) References Cited

U.S. PATENT DOCUMENTS

| | | | |
|---|---|---|---|
| 3,641,357 A | 2/1972 | Gratzmuller | |
| 4,455,586 A * | 6/1984 | McCartney | H02H 9/06 361/111 |
| 7,633,022 B2 | 12/2009 | Zöls | |
| 8,207,742 B2 | 6/2012 | Sawhney et al. | |
| 8,379,361 B2 | 2/2013 | Bleus et al. | |
| 9,276,401 B2 | 3/2016 | Rozman et al. | |
| 2009/0201617 A1 | 8/2009 | Yamaguchi | |
| 2013/0256274 A1 | 10/2013 | Faulkner | |
| 2015/0131189 A1 | 5/2015 | Davidson et al. | |
| 2016/0172963 A1 | 6/2016 | Gopinath et al. | |
| 2016/0276826 A1 | 9/2016 | Heurtier et al. | |

OTHER PUBLICATIONS

IBM: List of IBM Patents or Patent Applications Treated As Related (Appendix P), Aug. 16, 2017, pp. 1-2.
Pusorn et al., "Low Cost AC Solid State Circuit Breaker", PEDS 2007, pp. 1724-1729.
Pending U.S. Appl. No. 15/347,864, filed Nov. 10, 2016, entitled: "Inductive Kickback Protection by Using Multiple Parallel Circuit Breakers With Downstream TVS Diodes", pp. 1-18.

* cited by examiner

*Primary Examiner* — Dharti H Patel
(74) *Attorney, Agent, or Firm* — Richard A. Wilhelm

(57) ABSTRACT

Embodiments of the present invention disclose an apparatus including a power source and a plurality of electronic subsystems connected in parallel to the power source. Each of the plurality of electronic sub systems includes a circuit breaker, a transient-voltage-suppression (TVS) diode, and a load. The TVS diode is located downstream of the circuit breaker in each of the plurality of electronic systems.

1 Claim, 5 Drawing Sheets

INDUCTIVE KICKBACK PROTECTION BY USING MULTIPLE PARALLEL CIRCUIT BREAKERS WITH DOWNSTREAM TVS DIODES

BACKGROUND

The present invention relates generally to the field of electronic systems, and more particularly to the protection of system power integrity and protection of active devices from being damaged when a short occurs.

In a high availability, redundant electronic system, solid state circuit breakers are commonly used to protect the system as a whole from short circuits on individual components within the system. There will be a main power source running through the system. Active devices that are capable of failing (shorting) must not be placed directly on the main power source. This prevents a short on a device from taking down the main power source, thus taking down the entire system. All active electronic components are instead placed downstream of circuit breakers. If one of these active components fails (shorts), the circuit breaker will trip and only those devices downstream of that particular circuit breaker will lose power. All remaining devices that are downstream of other circuit breakers will remain functional.

BRIEF SUMMARY

Additional aspects and/or advantages will be set forth in part in the description which follows and, in part, will be apparent from the description, or may be learned by practice of the invention.

Embodiments of the present invention disclose an apparatus including a power source and a plurality of electronic subsystems connected in parallel to the power source. Each of the plurality of electronic subsystems includes a circuit breaker, a transient-voltage-suppression (TVS) diode, and a load. The TVS diode is located downstream of the circuit breaker in each of the plurality of electronic subsystems.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
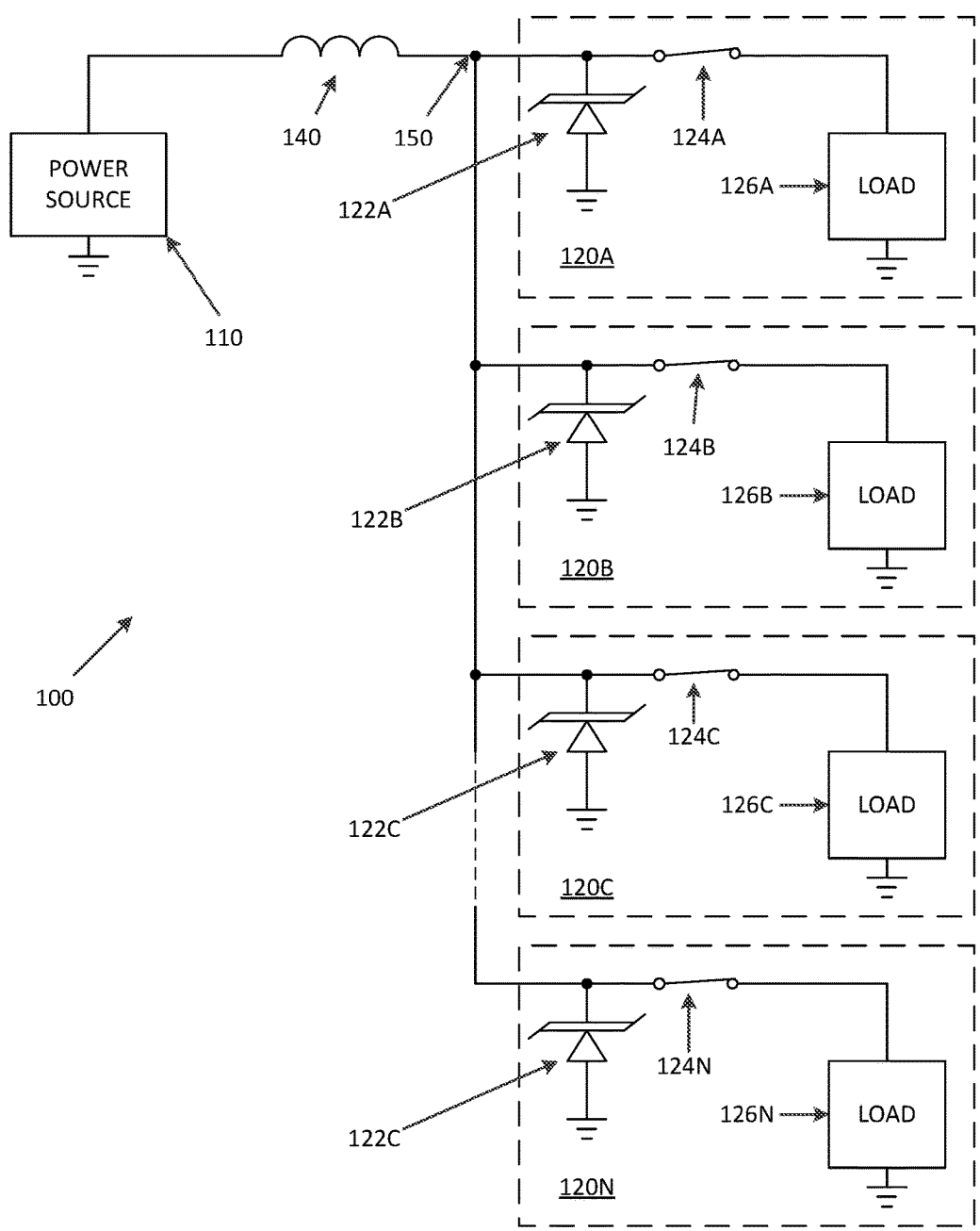
FIG. 1 illustrates a circuit diagram of an electronic system for where a transient-voltage-suppression (TVS) diode is upstream of a circuit breaker of a subsystem.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to an electronic system for the prevention of power supply shutdown and prevention of damage to electronic devices caused by inductive kickback when a circuit breaker trips (due to a downstream component short). When multiple subsystems are connected to a power source in parallel, wherein each of the subsystems comprises at least a circuit breaker, a transient-voltage-suppression (TVS) diode, and a load. The TVS diode and the load are located downstream of the circuit breaker. When a circuit breaker trips (due to a downstream short) a kickback voltage is created, caused by the parasitic inductance between the circuit breaker and power supply and the sudden decrease in current though this inductance. This kickback energy is dissipated through the TVS diodes of other subsystems that are connected in parallel, thus preventing damage to any of the subsystems when a circuit breaker trips. All of this happens without the risk of having the fallible TVS diodes upstream of the circuit breakers. This prevents a short of a TVS from causing the entire system to lose power.

FIG. 1 illustrates a circuit diagram for an electronic system for when a transient-voltage-suppression (TVS) diode is upstream of a circuit breaker of a subsystem. The electronic system 100 includes a power source 110, a parasitic inductance 140, and a plurality of subsystems 120A to 120N connected in parallel. Each of the plurality of subsystems 120A, 120B, 120C to 120N includes a transient-voltage-suppression (TVS) diode 122A, 122B, 122C to 122N, a circuit breaker 124A, 124B, 124C to 124N, and a load 126A, 126B, 126C to 126N. Load 126A, 126B, 126C to 126N can be, for example, any type of electronic component, circuit component or device that draws power from the power source 110 via the circuit connected to the subsystems 120A, 120B, 120C to 120N, respectively. The load 126A, 126B, 126C to 126N is located in parallel with each of the TVS diodes 122A, 122B, 122C to 122N, respectively.

TVS diodes 122A, 122B, 122C to 122N are solid state pn junction devices specifically designed to protect sensitive semiconductors from damaging effects of transient voltages. The electrical characteristics of the device are determined by factors such as junction area, doping concentration, and substrate resistivity. The surge power and surge current capability of the TVS diode 122A, 122B, 122C to 122N are proportional to the junction area. TVS diodes 122A, 122B, 122C to 122N are constructed with large cross sectional area junctions for absorbing high transient currents. When the normal operating voltage of the protected circuit is exceeded, the TVS diode 122A, 122B, 122C to 122N junction avalanches providing a low impedance path for the transient current. As a result, the transient current is diverted away from the protected components and shunted through the TVS diodes 122A, 122B, 122C to 122N. The TVS diodes 122A, 122B, 122C to 122N return to high impedance state after the transient threat passes.

The electronic system 100 of FIG. 1 illustrates a plurality of subsystems 120A, 120B, 120C to 120N connected in parallel to a power source 110. Subsystem 120B will be discussed in more detail as an example and the other subsystems have a similar configuration. Subsystem 120B includes a TVS Diode 122B upstream of a circuit breaker 124B and a load 126B.

Figure 2:
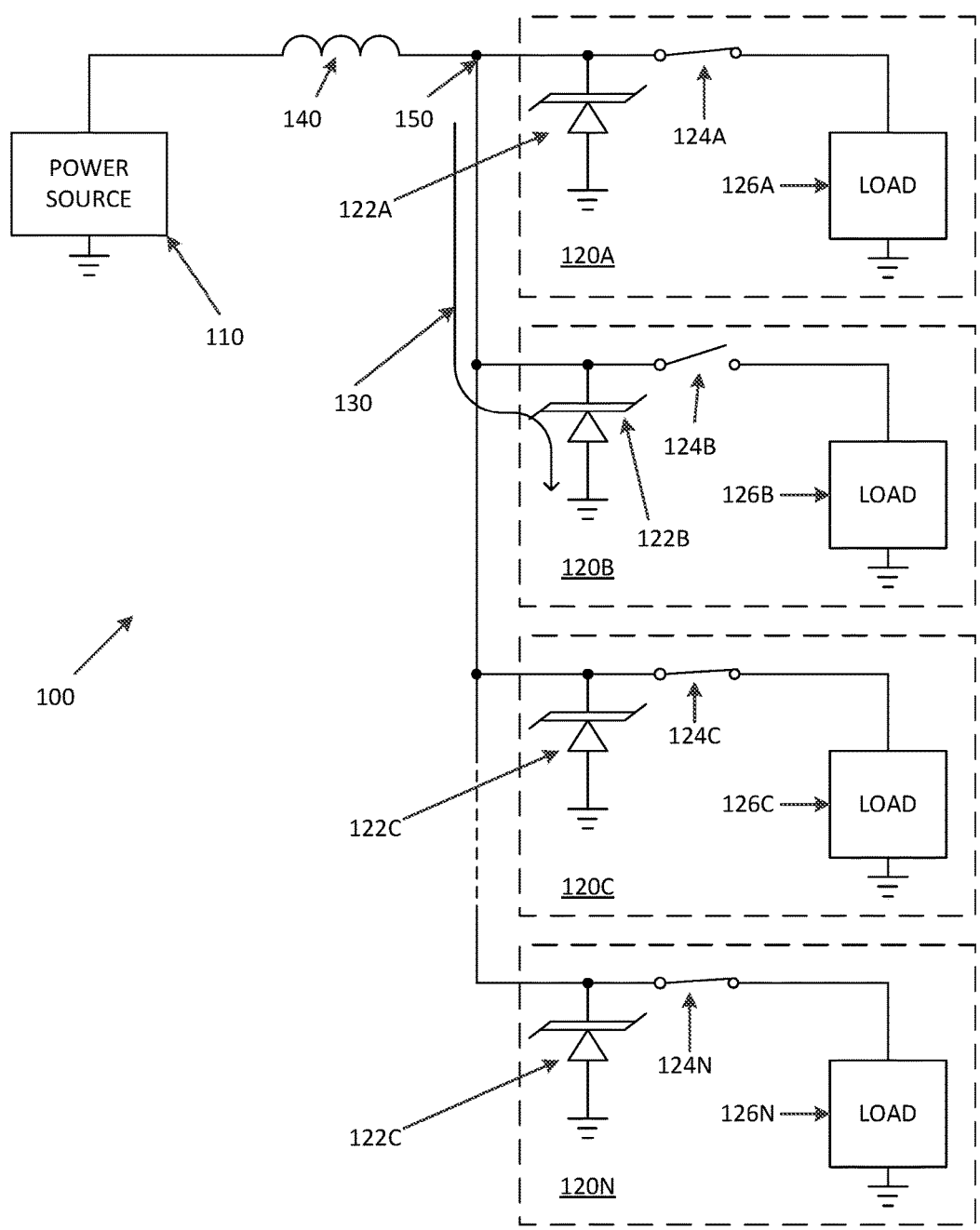
FIG. 2 illustrates the path of inductive kickback energy when a circuit breaker is tripped in an electronic subsystem.

The electronic system 100 of FIG. 2 illustrates a plurality of subsystems 120A, 120B, 120C to 120N connected in parallel to a power source 110, when the a device in the load shorts and the circuit breaker 124B trips.

The tripping of one circuit breaker 124B does, however, cause a negative effect on the input of all of the other subsystems 120A, 120C to 120N. The negative effect is called inductive kickback 130. There will always be some parasitic inductance 140 between the power source 110 and the circuit breaker 124B. If the load 126B downstream of a circuit breaker 124B is pulling energy from the power source 110 (through the parasitic inductance 140), and that circuit breaker 124B trips do to a short, inductive kickback 130 will happen at the input 150 of the subsystems 120A, 120B, 120C to 120N. This results in a temporary voltage spike. This temporary voltage spike may damage devices in the other subsystems. TVS diode 122B will channel most of the energy of the voltage spike to ground and maintain a constant voltage on the inputs 150 to the subsystems 120A, 120B, 120C to 120N, thus preventing damage. The problem with this implementation is that the TVS diode 122B itself can fail (short). Since it is upstream of the circuit breaker 124B, a failure of the TVS diode 122B can take out the power source 110 and therefore the electronic system 100. As illustrated by FIG. 2, circuit breaker 124B trips, an inductive kickback 130 is created and is dissipated through TVS diode 122B of the same subsystem 120B.

Figure 3:
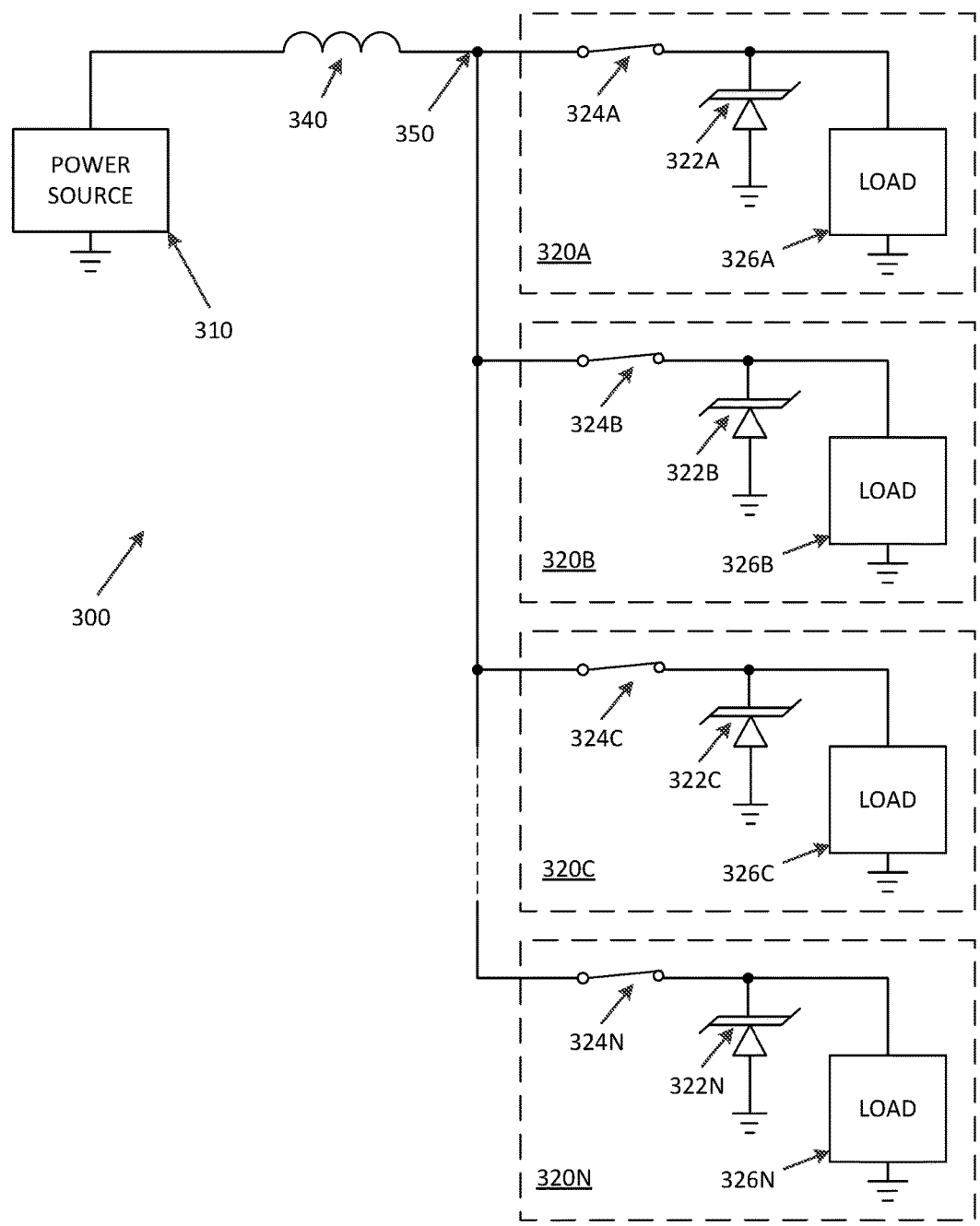
FIG. 3 illustrates a circuit diagram of an electronic system where a TVS diode is downstream of a circuit breaker of a subsystem, in accordance with an embodiment of the present invention.
Figure 4:
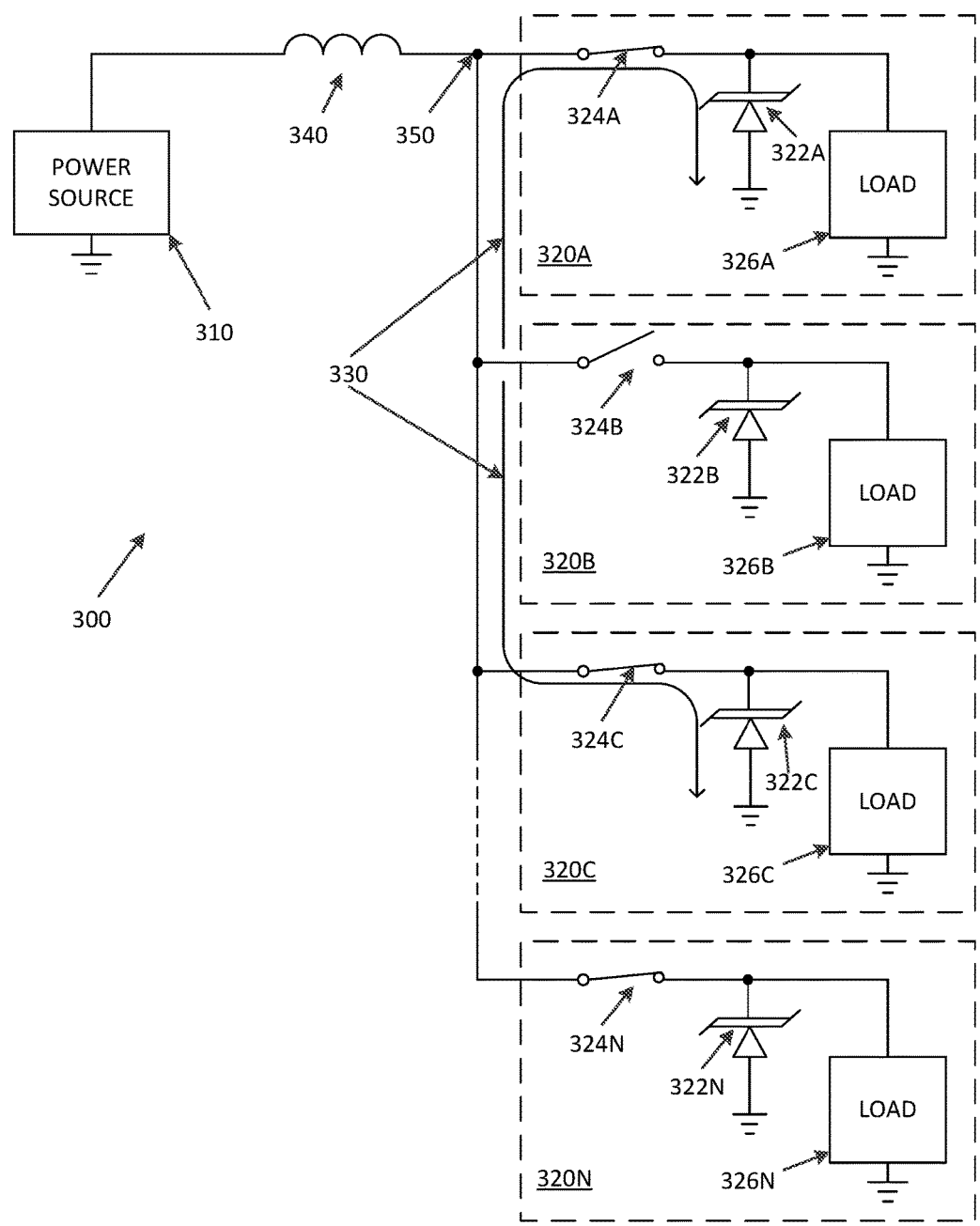
FIG. 4 illustrates the path of inductive kickback energy when a circuit breaker is tripped in electronic subsystem, where the TVS diode is downstream of a tripped circuit breaker, in accordance with an embodiment of the present invention.
Figure 5:
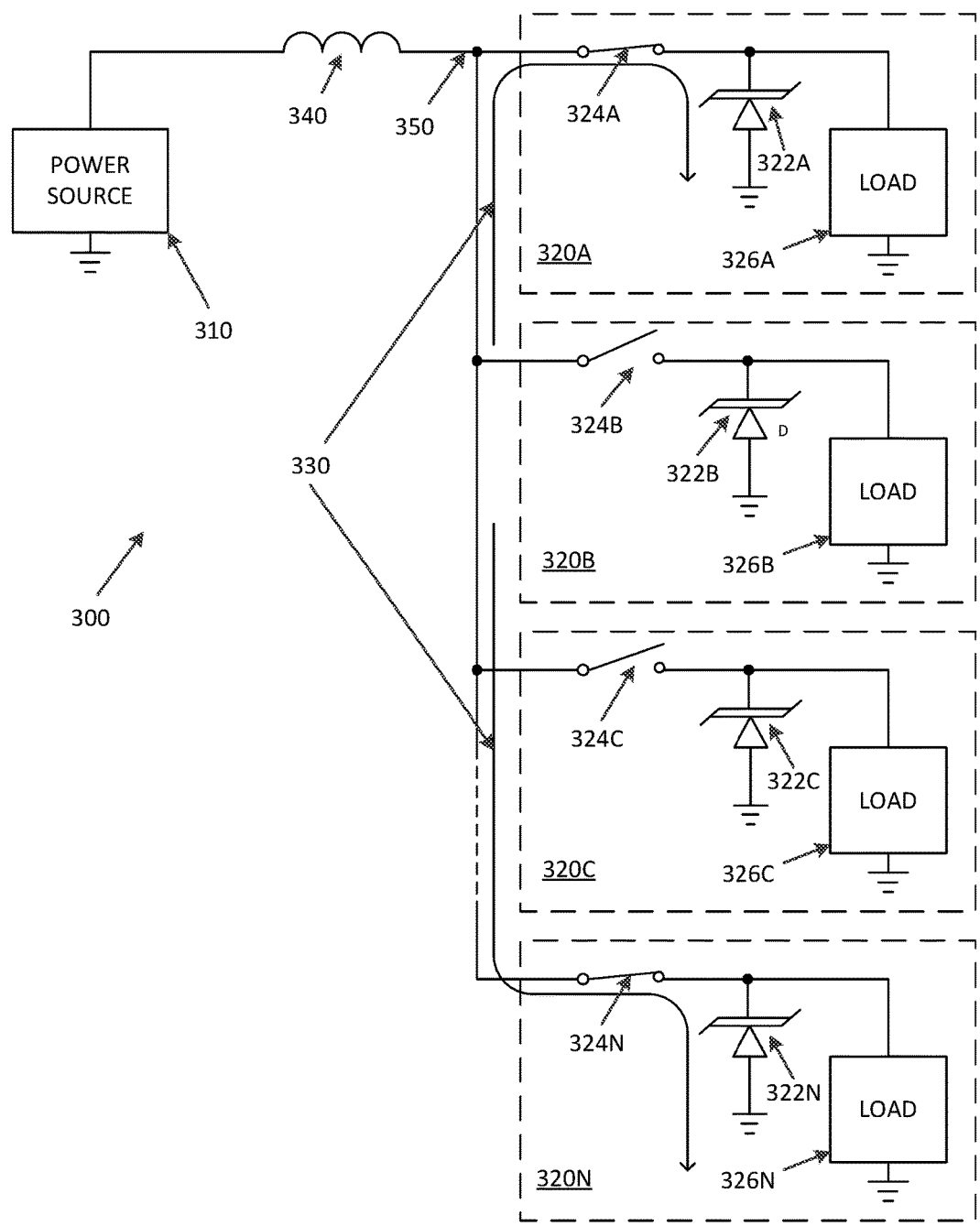
FIG. 5 illustrates a kick back voltage when a plurality of circuit breakers are tripped in electronic subsystem, where the TVS diode is downstream of a tripped circuit breaker, in accordance with an embodiment of the present invention.

FIG. 3 illustrates a circuit diagram for an electronic system when a TVS diode is downstream of a circuit breaker of a subsystem, in accordance with an embodiment of the present invention. FIGS. 4 and 5 illustrates an inductive kick back when a circuit breaker is tripped in an electronic system, when the TVS diode is downstream of the circuit breaker, in accordance with an embodiment of the present invention.

The electronic system 300 of FIGS. 3, 4 and 5 have a similar set up as the electronic system 100 of FIGS. 1 and 2. The electronic system 300 includes a power source 310, a parasitic inductance 340, and a plurality of subsystems 320A to 320N connected in parallel. Each of the plurality of subsystems 320A, 320B, 320C to 320N includes a transient-voltage-suppression (TVS) diode 322A, 322B, 322C to 322N, a circuit breaker 324A, 324B, 324C to 324N, and a load 326A, 326B, 326C to 326N. TVS diodes 322A, 322B, 322C to 322N are located downstream of each of their respective circuit breakers 324A, 324B, 324C to 324N.

Subsystems 320A, 320B, 320C to 320N are connected in parallel to the power source 310. For example, when circuit breaker 324B trips, an inductive kickback 330, also known as a kickback voltage, is generated at the input 350 of the subsystems 320A, 320B, 320C to 320N, but since the TVS diode 322B is located downstream of the circuit breaker 324B it does not dissipate the inductive kickback 330. Instead the inductive kickback 330 at the input 350 to the subsystems 320A, 320B, 320C to 320N is distributed to the parallel subsystems. As illustrated by FIGS. 4 and 5, the inductive kickback 330 at the input 350 to the subsystems 320A, 320B, 320C to 320N is distributed to one or a plurality of the subsystems 320A, 320C to 320N. The path of the inductive kickback 330 is distributed to subsystems that have not failed. As illustrated by FIG. 5, if the circuit breakers 324B and 324C of subsystems 320B and 320C have tripped then the inductive kickback 330 is dissipated by subsystems that have not experienced a failure of their circuit breakers. The power to system 310 is not interrupted and the voltage at the input to the subsystems 320A, 320B, 320C to 320N is held below a point that can damage other devices in system 300. If a TVS diode 322B fails (shorts), the same event happens. The power to system 300 is not interrupted and the voltage at the input 350 to the subsystems is held below a point that can damage other devices in system 300.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. An apparatus comprising:
   a power source; and
   a plurality of electronic subsystems connected in parallel to the power source;
   wherein each of the plurality of electronic subsystems includes a circuit breaker, a transient-voltage-suppression (TVS) diode, and a load;
   wherein the TVS diode is located downstream of the circuit breaker in each of the plurality of electronic subsystems;
   wherein the load is located downstream of the circuit breaker and in parallel with the TVS diode in each of the plurality of electronic systems; and
   wherein when a plurality of circuit breakers in multiple of the plurality of electronic system fails an inductive kickback is generated, wherein the inductive kickback is dissipated through another of the parallel connected electronic systems.

* * * * *